United States Patent [19]

Gelernt

[11] 4,383,431
[45] May 17, 1983

[54] AUTO-ZERO SYSTEM FOR PRESSURE TRANSDUCERS

[75] Inventor: Barry Gelernt, Bridgeport, Conn.

[73] Assignee: The Perkin-Elmer Corporation, Norwalk, Conn.

[21] Appl. No.: 203,735

[22] Filed: Nov. 3, 1980

[51] Int. Cl.³ .............................................. G01L 27/00
[52] U.S. Cl. ...................................... 73/4 R; 73/714; 73/724
[58] Field of Search ................. 73/4 V, 4 R, 714, 724, 73/756, 749

[56] References Cited

U.S. PATENT DOCUMENTS 4,204,422  5/1980  Inoue et al. ............................ 73/4 R

OTHER PUBLICATIONS

Roehrig et al., 1961 Transactions of 8th Nat. American Vacuum Society Sym., pp. 511-518.

Primary Examiner—Donald O. Woodiel
Attorney, Agent, or Firm—S. A. Giarratana; E. T. Grimes; T. P. Murphy

[57] ABSTRACT

An apparatus for automatically compensating for deviation of a capacitance manometer reading from true pressure. The capacitance manometer is connected to a source of pressure having a value less than the pressure the capacitance manometer is capable of reading and the indicated pressure is stored as a correction factor. Thereafter, each pressure read by the manometer is adjusted by the correction factor.

12 Claims, 1 Drawing Figure

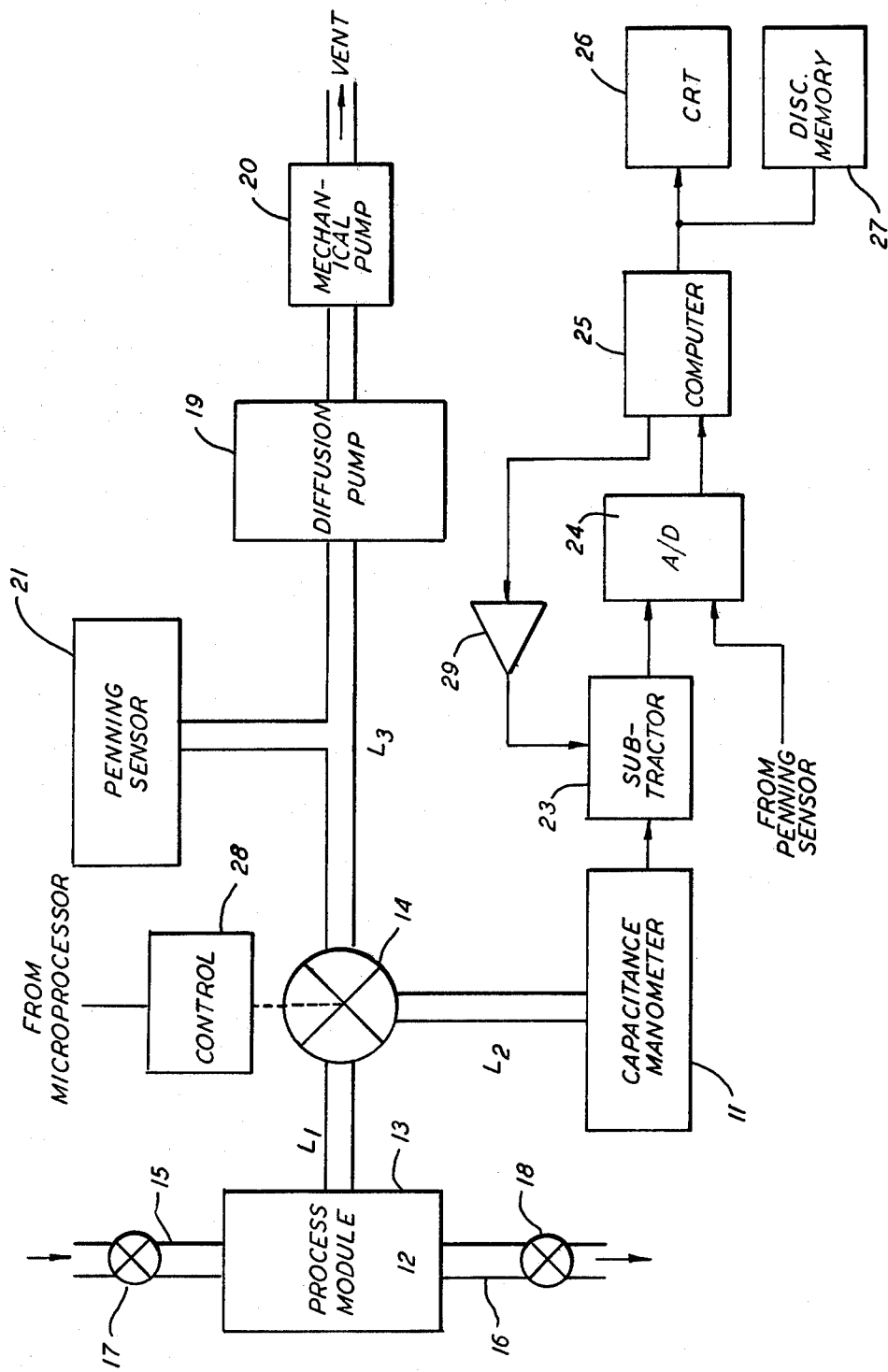

AUTO-ZERO SYSTEM FOR PRESSURE TRANSDUCERS

BACKGROUND OF THE INVENTION

Capacitance type manometers are presently the most accurate pressure gages available for measuring very low pressures, i.e., degree of vacuum. Due to their great accuracy capacitance manometers have become the primary standard for pressure measurements in vacuum systems of various types. One type of vacuum system in which capacitance manometers are used are plasma etching systems which perform a step in the manufacture of integrated circuits. As is well known in such systems, various materials are removed from silicon wafers in circuit patterns formed in a previous photoresist developing step. In such plasma etching systems control and, therefore, accurate measurement of the vacuum in which the etching must be carried out is critical.

However, capacitance manometers are subject to zero drift i.e., readings which deviate from true pressure. Zero drift may be the result of hysteresis relaxation, temperature variation, radio frequency pick-up and particularly chemical contamination.

Previously, this problem has been corrected by removing the manometer from a system, measuring it against a known reference and recalibrating it. This is done periodically or whenever there is a suspicion that the manometer has been providing inaccurate readings. Such a procedure requires that the vacuum system be out of use for periods of time. In certain systems such as etching systems where throughput of wafers is important from the standpoint of economy and efficiency, such delays are unacceptable.

The present invention is an apparatus which automatically compensates for deviation of a capacitance manometer from true pressure.

SUMMARY OF THE INVENTION

The present invention relates to a system for the in situ, automatic correction of variation of the readings of a capacitance manometer from true pressure. A three way valve normally connects the manometer to the chamber whose pressure is to be monitored. Periodically, the manometer is connected to a high vacuum pump such as a diffusion pump having a pressure at least an order of magnitude less than that which the manometer is capable of reading. The difference between zero reading and indicated pressure reading of the manometer is stored as a correction factor. The stored correction factor is subtracted from subsequent manometer readings of the pressure of the chamber being monitored to provide an accurate indication of the true pressure thereof.

DESCRIPTION OF THE DRAWING

The FIGURE illustrates in block diagram form a preferred embodiment of the present invention.

DESCRIPTION OF THE INVENTION

Referring to the FIGURE there is shown the capacitance manometer 11 of the present invention. The capacitance manometer 11 is the most accurate type of manometer made for measuring low pressures or vacuums and is obtainable from several vendors one of which is the MKS Corp. It is basically a parallel plate capacitor wherein one plate is a thin flexible metal membrane. One side of the membrane sees a vacuum and the other side sees the gas whose pressure is to be measured. Differences in degree of vacuum of each side of the membrane causes it to flex accordingly changing the capacitance to provide an output voltage representative of the pressure of the gas being measured. Such manometers typically read vacuums down to $10^{-3}$ Torr.

However, these manometers are subject to zero drift which causes inaccuracies in true pressure readings. This zero drift is caused by hysteresis relaxation by over pressurization, temperature variation and RF pick-up. However, the chief cause of zero drift in these manometers is chemical contamination, i.e. particles lodging on the metal membrane. Accumulation of such particles on the metal membrane seriously affects the value of the capacitance of the manometer and, therefore, its accuracy. Chemical contamination is a particular problem in plasma etching systems where the etching gases are particularly productive of contaminating particles.

The capacitance manometer 11 is normally connected to chamber 12 of a process module 13 via three way valve 14 where it continuously monitors the gas pressure in the chamber 12. The process module 13 has an inlet conduit 15 and an outlet conduit 16. Each of the inlet and outlet conduits 15 and 16 include valves 17 and 18, respectively. Thus, gas may be introduced and held in chamber 13, permitted to pass through chamber 12 or chamber 12 may be evacuated by applying suction to outlet conduit 16. In plasma etching of a silicon wafer chamber 12 is evacuated and then the etching gas is introduced and flows through chamber 12 for the time necessary to complete the etching of a silicon wafer which is disposed within chamber 12. During this time the chamber is maintained at a predetermined pressure by control of the degree of openings of valves 17 and 18. At the same time the gas is ionized to the degree necessary to obtain good etching results. In etching as well as other processes the pressure of the gas within chamber 12 is critical.

The valve 14 which in a first position connects capacitance manometer 11 to process module 13 has a second position which disconnects capacitance manometer 11 from process module 13 and connects it to diffusion pump 19.

Diffusion pump 19 is effective only at pressures below $2 \times 10^{-1}$ Torr. Thus, a mechanical pump 20 is used to pump diffusion pump 19 to a pressure below $2 \times 10^{-1}$ Torr.

A Penning Ionization sensor 21 is connected to diffusion pump 19 and functions to determine when diffusion pump 19 is operating efficiently.

When the Penning Ionization sensor 21 indicates that the diffusion pump is operative and the capacitance manometer reads a pressure in chamber 12 in the region of $2 \times 10^{-1}$ Torr, the valve 14 is moved to the second position isolating chamber 12 from and connecting diffusion pump 19 to the capacitance manometer 11. The diffusion pump 19 then pumps down to a pressure of $1 \times 10^{-5}$ Torr. Since the capacitance manometer 11 then sees a pressure at least an order of magnitude less than it is capable of reading, any output or indication it may have above its minimum readable pressure is an error. This is the correction which must be subtracted from the reading of the capacitance manometer 11 for subsequent monitoring of pressure in the chamber 12 of process module 13. This procedure may be repeated periodically to provide an updated correction factor for the capacitance manometer 11 whose zero drift may increase with time.

The capacitance manometer 11 provides a voltage representative of sensed pressure which may be fed directly to a meter (not shown) to provide a visual indication of measured pressure. Thus, when the valve 14 is in the second position the meter indicates the correction factor and when the valve 14 is in the first position the meter indicates the pressure in the chamber 12. From this pressure the correction factor is substracted to provide true reading of the pressure in chamber 12. Thus, with the present invention calibration of the capacitance manometer 11 may be accomplished manually with subtraction of the correction factor performed mentally.

The output of the capacitance manometer 11 is connected to a subtractor circuit 23 which is connected to an analog to digital converter 24. The output of the analog to digital converter is connected to a computer 25.

The computer 25 has an output connected to a CRT display 26 and to a storage unit, e.g., a disc memory 27.

An output of the computer 25 is also connected to control 28 which controls operation of valve 14.

The computer 25 has a further output connected to digital to analog converter 29 which is connected to subtractor 23.

The computer 25 comprises essentially a memory and process controller which provides control outputs in accordance with a simple program routine.

The program routine of the computer 25 for carrying out comprises the following steps:

1. Read the capacitance manometer—is pressure near $10^{-1}$ Torr?
2. Read the Penning sensor—is pressure near $10^{-5}$ Torr?
3. If yes, direct the capacitance manometer to the diffusion pump if Penning Sensor indicates diffusion pump is operative.
4. Read and store correction factor.
5. Direct capacitance manometer to process module.
6. Read pressure in process module.
7. Subtract correction factor from capacitance manometer reading of process module and store and display on CRT at request of operator.
8. Repeat cycle at predetermined time intervals and store each new correction factor in permanent memory.

The particular programming language into which the above program is translated, of course, dependent on the type of computer used.

When the capacitance manometer 11 is connected to the diffusion pump for a short time, its output which is the correction factor is converted into digital form and stored in computer 25. It is also stored in a permanent memory e.g., disc memory 27 which keeps a history of each correction factor determined during a cycle of the system.

This information provides an indication of the deterioration rate of the capacitance manometer 11 and is useful in determining the appropriate time when a particular capacitance manometer needs to be replaced.

The correction factor is also applied to subtractor 23 via digital to analog converter 29. The subtractor 23 subtracts the correction factor from the subsequent readings by the capacitance manometer 11 of process module pressure. These corrected readings are then converted to digital form in analog to digital converter 24 and stored in computer 25. The corrected readings may also be read out on CRT 26 at operator command.

The input to computer 25 from the Penning sensor 21 via analog to digital converter 24 functions as indicated above to prevent connection of the capacitance manometer 11 to the diffusion pump 19 until the Penning sensor 21 indicates the diffusion pump 19 is operative.

It should be noted that the diffusion pump 19 may be replaced with an ion pump which is smaller and functions in the same manner in the system as the diffusion pump 19. A sorption pump or a turbonuclear pump may also be used in place of the diffusion pump 19.

The computer 25 controls operation of the valve 14 via control 28 in accordance with the above outlined program.

In an actual etching process with which this invention may be used valve 17 is held closed while the chamber 12 is ruffed i.e., brought down to a relatively low pressure by means of a pump (not shown) communicating with chamber 12 via open valve 18. This cleans the chamber 12 of previous etching gases and contaminants. Valve 18 is then closed, and etching gases are introduced into chamber 12 via valve 17. Applicant's system functions to monitor the pressure of the etching gases in the chamber 12 the value of which during the etching process is critical.

However, it should be pointed out that the present invention is not limited to wafer etching and is useful in any situation wherein a capacitance manometer is used to monitor very low pressures.

Other modifications of the present invention are possible in light of the above description which should not be deemed as limiting this invention beyond those limitations set forth in the claims which follow.

What is claimed is:

1. An apparatus for correcting zero drift of a capacitance manometer, comprising in combination;
    pump means,
    first means connecting the capacitance manometer to said pump means when said pump means is at a pressure at least an order of magnitude less than the lowest readable pressure of the capacitance manometer,
    second means connected to the capacitance manometer recording the reading of the capacitance manometer as a correction factor when it is connected to said pump means,
    third means connected to the capacitance manometer and said second means for applying said correction factor to subsequent readings of the capacitance manometer.

2. An apparatus according to claim 1 wherein, said pump means is a diffusion pump.

3. An apparatus according to claim 1 wherein, said pump means is an ion pump.

4. An apparatus according to claim 1 wherein, said pump means is a turbomolecular pump.

5. An apparatus according to claim 1 wherein, said pump is a sorption pump.

6. An apparatus according to claim 2 further including,
    mechanical pump means connected to said diffusion pump to pump said diffusion pump to a pressure at which said diffusion pump operates efficiently.

7. An apparatus according to claim 3 further including, mechanical pump means connected to said ion pump to pump said ion pump to a pressure at which said ion pump operates efficiently.

8. An apparatus according to claim 6 or 7 further including,
sensor means connected to said pump means for determining that said pump means is operative prior to connecting the capacitance manometer thereto.

9. An apparatus according to claim 8 further including,
a process module containing a chamber whose pressure is to be monitored by the capacitance manometer,
said first means connecting the capacitance manometer to said process module after said correction factor has been recorded.

10. An apparatus according to claim 9 further including,
display means connected to said third means for displaying the corrected pressure read by the capacitance manometer.

11. An apparatus according to claim 10 further including,
permanent storage means connected to the capacitance manometer for recording each correction factor thereof.

12. An apparatus according to claim 11 further including,
control means connected to said first means,
computer means connected to said control means,
said computer means including said third means and receiving an input from said sensor means for causing said first means to connect the capacitance manometer to said pump means when said sensor means determines said pump means is operative.

* * * * *